United States Patent [19]
Iijima et al.

[11] Patent Number: 6,094,805
[45] Date of Patent: *Aug. 1, 2000

[54] METHOD FOR MANUFACTURING MAGNETIC HEAD

[75] Inventors: Atsushi Iijima, Saku; Junko Tange, Komoro, both of Japan

[73] Assignee: TDK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/055,304

[22] Filed: Apr. 6, 1998

Related U.S. Application Data

[63] Continuation-in-part of application No. 08/579,765, Dec. 28, 1995, abandoned.

[51] Int. Cl.[7] ........................................... G11B 5/42
[52] U.S. Cl. ........................................ 29/603.12; 360/103
[58] Field of Search ......................... 29/603.12, 603.15, 29/603.18; 360/103

[56] References Cited

U.S. PATENT DOCUMENTS

| | | |
|---|---|---|
| 3,649,283 | 3/1972 | Christensen et al. . |
| 4,564,585 | 1/1986 | Blaske et al. . |
| 4,624,048 | 11/1986 | Hinkel et al. . |
| 4,673,996 | 6/1987 | White . |
| 4,870,519 | 9/1989 | White . |
| 5,509,554 | 4/1996 | Samuelson et al. . |
| 5,566,075 | 10/1996 | Syouji et al. . |
| 5,640,755 | 6/1997 | Kubota et al. .................. 29/603.16 |
| 5,685,064 | 11/1997 | Matsuzaki et al. ............. 29/603.12 |

FOREIGN PATENT DOCUMENTS

| | | |
|---|---|---|
| 57-122063 | 7/1982 | Japan . |
| 3-190215 | 8/1991 | Japan . |
| 3-212811 | 9/1991 | Japan . |
| 4-274008 | 9/1992 | Japan . |
| 4-274014 | 9/1992 | Japan . |
| 7-105650 | 4/1995 | Japan . |

*Primary Examiner*—Carl E. Hall
*Attorney, Agent, or Firm*—Oblon, Spivak, McClelland, Maier & Neustadt P.C.

[57] ABSTRACT

A method for manufacturing a magnetic head which includes the steps of overlaying a resist sheet which is provided with an organic resist film on a supporting body on the air bearing surface of the magnetic head; transferring the organic resist film on to the air bearing surface and then removing the supporting body from the organic resist film; through a patterning process partially removing the organic resist film to achieve the pattern required for machining; and performing machining on the air bearing surface via gaps in the organic resist film and then removing the resist film.

12 Claims, 8 Drawing Sheets

METHOD FOR MANUFACTURING MAGNETIC HEAD

CROSS REFERENCES TO RELATED APPLICATIONS

This application is a continuation-in-part of U.S. patent application Ser. No. 08/579,765 filed Dec. 28, 1995 abanodoned, and entitled "Method for Manufacturing Magnetic Head," which is incorporated herein by reference. This application is related to Japanese Patent Application 252615/1993 filed Sep. 14, 1993 which is also incorporated herein by reference.

BACKGROUND OF THE INVENTION

1. Field of the Invention

The present invention relates to a method for manufacturing a magnetic head. To be more specific, it relates to a manufacturing method that is suited for performing fine machining on the air bearing surfaces of a magnetic head.

2. Discussion of Background

For this type of magnetic head, it is sometimes necessary to perform fine machining on the air bearing surfaces in order to set the width of the pole portions in the direction of the tracks, to achieve the desired electromagnetic conversion characteristics and flight attitude and the like. For instance, Japanese Unexamined Patent Publication (KOKAI) Nos. 274014/1992 and 274008/1992 disclose a technology to set the width of the pole portions in the direction of the tracks with high precision and to improve the electromagnetic conversion characteristics by providing an indented portion of minute depth at one end of the air bearing surfaces in the direction of the width of the pole portions or in the direction of the thickness (length) of the pole portions.

Also, the TPC (Transverse Pressure Contour) type sliders which are disclosed in Japanese Unexamined Patent Publication (KOKAI) No. 278087/1986, Japanese Unexamined Utility Model Publication (KOKAI) No. 122063/1982 (Utility Model Application No. 5815/1981), U.S. Pat. No. 4,673,996, U.S. Pat. No. 4,870,519 and the like, require fine machining in order to form a minute step portion or a tapered portion at a side of the rail portions. A TPC slider, when mounted in a rotary actuator type magnetic disk device, generates dynamic lift pressure at the step portion with the airflow coming in from the transverse direction at positions where the skew angle is large and, with this, any reduction in the flying height at positions where the skew angle is large is prevented so that a constant flying height is assured overall and so that the flight attitude is stabilized.

A known means for performing the fine machining described above on the air bearing surfaces involves adhering an organic resist on the air bearing surface, performing patterning on this resist so that it will have a pattern corresponding to the machining required and then performing ion milling or the like using the resist that remains after the patterning and that functions as a protective film. Prior art literature that discloses such technology includes Japanese Unexamined Patent Publication (KOKAI) Nos. 190215/1991 and 212811/1991. Of these, Japanese Unexamined Patent Publication (KOKAI) No. 190215/1991 discloses a technology that employs the spin-coat method and Japanese Unexamined Patent Publication (KOKAI) No. 212811/1991 discloses a technology that employs a jig for dry etching machining.

Generally speaking, when the spin-coat method is employed, resist liquid collects on the edge portion which faces opposite the direction of the rotation, making the thickness of the resist film inconsistent. In order to solve this problem, Japanese Unexamined Patent Publication (KOKAI) No. 190215/1991 discloses a technology through which the thickness of the resist film is made consistent by making the substrate that is used for the slider of the magnetic head incline by grinding off an edge. This grinding requirement is one of the problems of the prior art technology.

In the case of Japanese Unexamined Patent Publication (KOKAI) No. 212811/1991, which employs a jig for dry etching machining, a high degree of dimensional precision is required for the difference in the levels of the steps of the object of machining and the jig in order to improve the accuracy of the film thickness. In addition, the machining precision on the object of machining performed prior to the insertion into the jig must also be high. These factors increase the cost of production.

SUMMARY OF THE INVENTION

It is an object of the present invention to provide a method for manufacturing a magnetic head with which fine machining can be performed on the air bearing surfaces.

It is another object of the present invention to provide a method for manufacturing a magnetic head with which it is possible to form a consistent resist film on the air bearing surface, regardless of its contour.

It is yet another object of the present invention to provide a method for manufacturing a magnetic head with which a consistent resist film can be formed easily on the air bearing surface.

In order to achieve the objects described above, the method for manufacturing a magnetic head according to the present invention includes a transfer process, a patterning process and a machining process. In the transfer process, a resist sheet that is constituted by providing an organic resist film on a supporting body is placed on the air bearing surface to transfer the resist film on to the air bearing surface, after which, the supporting body is removed. This process, unlike the spin-coat method, eliminates the necessity for providing an inclination at an end of the air bearing surface. Because of this, it is possible to form a consistent resist film on the air bearing surface, regardless of its contour. Moreover, with the consistent film thickness of the resist film formed on the resist sheet, the consistent film thickness required for fine machining is achieved.

During the patterning process which follows the transfer process, the resist film is partially removed in order to achieve the pattern required for machining. In the machining process, the machining mentioned earlier is performed on the air bearing surface via the gaps in the resist film which is left over after the patterning process. Then the remaining resist film is removed. Through this process, it becomes possible to form a resist film with a consistent film thickness and with the pattern required for fine machining on the air bearing surface and thus it is possible to perform fine machining on the air bearing surface. With this, a consistent resist film can be formed regardless of the contour of the air bearing surface and it becomes possible to perform fine machining on the air bearing surface.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
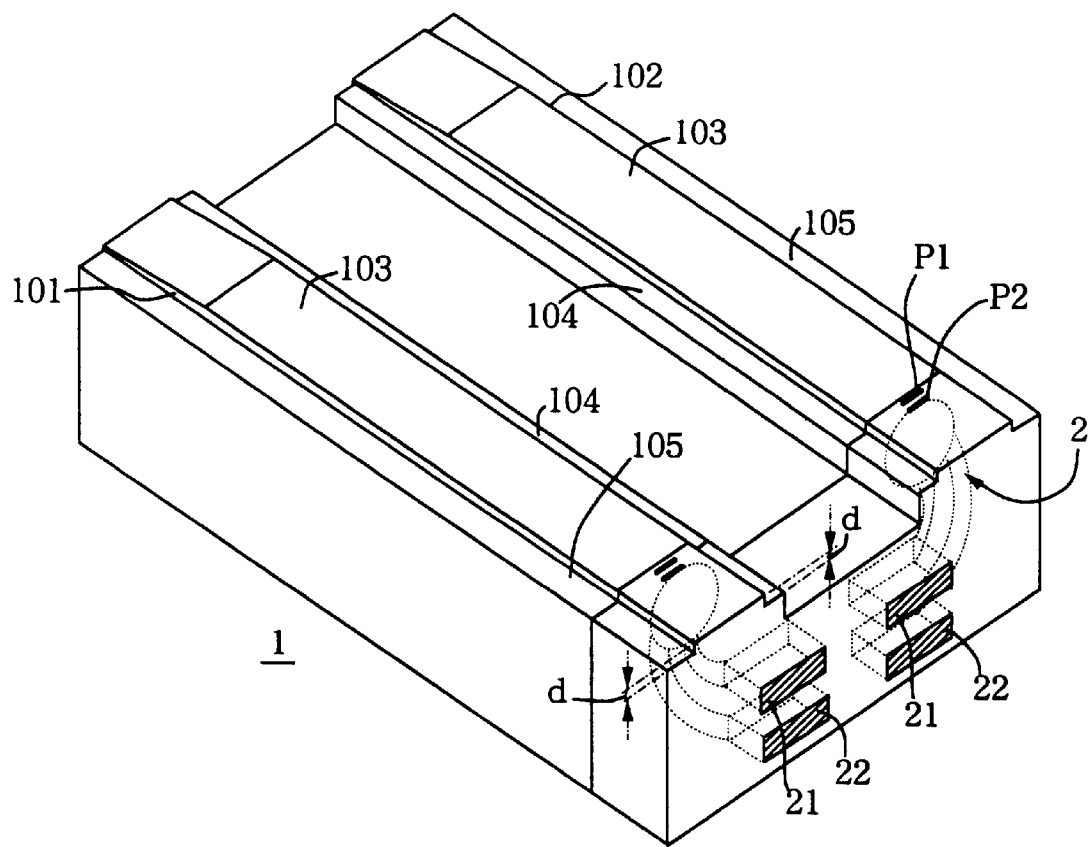
FIG. 1 is a perspective of a magnetic head to which the manufacturing method according to the present invention may be applied.

In FIG. 1, which shows a magnetic head provided with a TPC type slider, the magnetic head includes a slider 1 and magnetic transducer 2. In FIG. 1, some dimensions are exaggerated. The slider 1 is provided with rail portions 101 and 102 on the surface that faces opposite the medium. The rail portions 101 and 102 are each provided with an air bearing surface 103, a first step portion 104 and a second step portion 105 on the surface that faces opposite the medium. The first step portion 104 is provided at the edge at one end of the air bearing surface 103 in the direction of the width along the direction of the length of the air bearing surface 103. The second step portion 105 is provided at the edge at the other end of the air bearing surface 103 in the direction of its width along the direction of the length of the air bearing surface 103.

The rail portions 101 and 102 are provided parallel to each other separated by a gap. The first step portions 104 are provided on the inner ends that face each other. The second step portions 105 are provided on the outer ends of the rail portions 101 and 102. The depth d of the first step portions 104 and the second step portions 105 is set at a minute dimension to satisfy, for instance, $1\ \mu m \geq d \geq 0.6\ \mu m$. The present invention may be applied to the formation of the first step portions 104 and the second step portions 105 with such a minute dimension.

The magnetic transducer 2 may be an induction type, MR (magnetoresistive) type, or a combination of the two. These elements may be constituted with thin film elements formed through processes that are identical to those of IC manufacturing technology. In addition, the recording method is not limited to the in-plane recording method, and may be the vertical recording method. A magnetic conversion element 2 includes pole portions P1 and P2 with the end surfaces of the pole portions P1 and P2 emerging at the surface of the air bearing surface 103. Reference numbers 21 and 22 indicate take-out electrodes.

Figure 2:
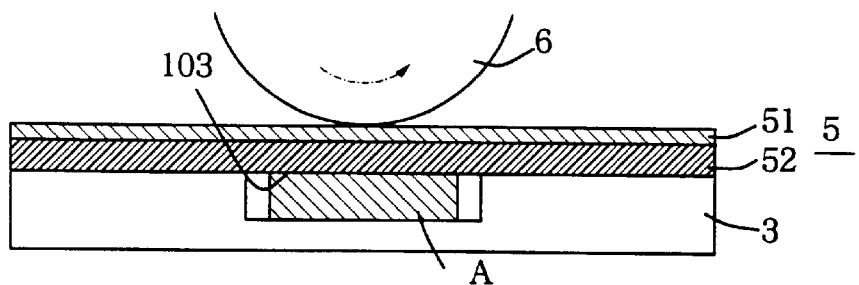
FIG. 2 illustrates a step included in the method for manufacturing a magnetic head according to the present invention.
Figure 3:
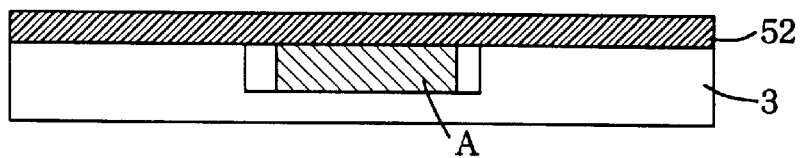
FIG. 3 illustrates a step that follows the step illustrated in FIG. 2.
Figure 4:
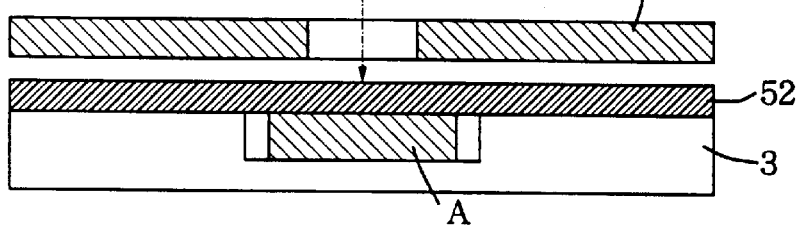
FIG. 4 illustrates a step that follows the step illustrated in FIG. 3.
Figure 5:
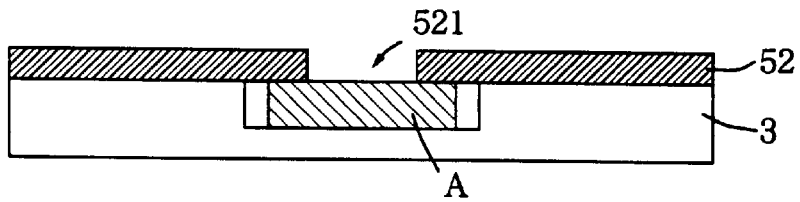
FIG. 5 illustrates a step that follows the step illustrated in FIG. 4.
Figure 6:
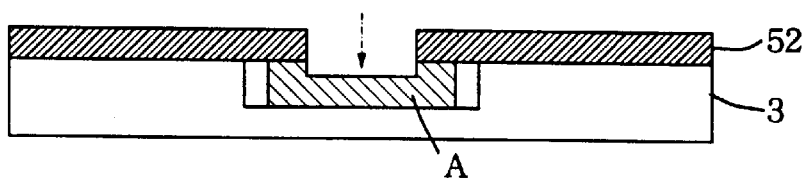
FIG. 6 illustrates a step that follows the step illustrated in FIG. 5.
Figure 7:
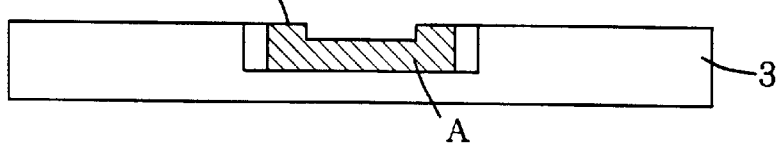
FIG. 7 illustrates a step that follows the step illustrated in FIG. 6.

FIGS. 2 to 7 are process drawings that show an example of the method for manufacturing a magnetic head according to the present invention. The method for manufacturing a magnetic head according to the present invention includes a transfer process, a patterning process and a machining process. The transfer process is illustrated in FIGS. 2 and 3, the patterning process is illustrated in FIGS. 4 and 5 and the machining process is illustrated in FIGS. 6 and 7.

In the transfer process, a magnetic head A is arranged on a jig 3 with one of its surfaces secured to the jig 3 by means such as bonding. A resist sheet 5, which is provided with an organic resist film 52 on a supporting body 51, is placed on top of the air bearing surface 103. Then the resist film 52 is transferred on to the air bearing surface 103. The transfer can be achieved through thermo-compression bonding using a hot roller 6 (see FIG. 2). Next, as shown in FIG. 3, the supporting body 51 is removed. The resist film 52 is not removed and remains on the magnetic head A and on the jig 3. Unlike the spin-coat method, this process eliminates the necessity of providing an inclination at the end of the air bearing surface 103. Because of this, a consistent resist film 52 can be formed on the air bearing surface 103 regardless of the contour of the air bearing surface 103. Furthermore, with the consistent film thickness of the resist film 52 formed on the resist sheet 5, a consistent film thickness required for fine machining is achieved.

The supporting body 51 is a flexible film, constituted of polyethylene terephthalate or the like. Generally, a photo sensitive resist is used for the resist film 52. The photo sensitive resist may be either the negative type or the positive type. In the embodiment, a positive type photo sensitive resist is used. Positive type photo sensitive resists include, for instance, PFR 3004 (manufactured by Nippon Gosei Gommu Co. Ltd.). The resist film 52 may be formed through, for instance, the spin-coat method. The film thickness of the resist film 52 is set at a consistent thickness required for machining the air bearing surface 103.

In the patterning process, which follows the transfer process, the unnecessary resist film 52 is removed to achieve the pattern required for machining. To be more specific, as shown in FIG. 4, an exposure mask 7 is positioned on the resist film 52 to expose the resist film 52. After that, as shown in FIG. 5, the exposed area 521 is etched with, for instance, an alkaline developer.

In the machining process, machining such as ion milling is performed on the air bearing surface 103 via the gaps in the resist film 52 which remain after the patterning process, as shown in FIG. 6. Then, as shown in FIG. 7, the remaining resist film 52 is removed.

Through the patterning process and the machining process described above, it becomes possible to form the resist film 52 with a consistent film thickness provided with the pattern required for fine machining on the air bearing surface 103 and thus it becomes possible to perform fine machining on the air bearing surface 103. This makes it possible to form a consistent film 52 on the air bearing surface 103 regardless of the contour of the air bearing surface 103 and to perform fine machining on the air bearing surface 103.

The resist sheet 5, shown in FIG. 2, is obtained by applying a flexible film such as polyethylene terephthalate or the like, which constitutes the supporting body 51, on to a spin jig (not shown) and spin-coating a positive type organic resist on to it. When using PFR3004 (manufactured by Nippon Gosei Gommu Co. Ltd.) for the positive type resist, by spin-coating the organic resist at a viscosity of 160 cp at a rotation rate of 3000 rpm, a resist film 52 with a film thickness of 4.5 μm is obtained. The film thickness can easily be changed by adjusting the viscosity and the rotation rate. Since the spin jig has a high degree of flatness and the thickness of the supporting body is consistent, the film thickness of the spin-coated resist is also consistent. Other methods that can be employed for forming the resist film 52 include the dip method, the roll coat method and the spray coat method.

As described above, when the supporting body 51 is constituted of a flexible film such as polyethylene terephthalate, and the resist film 52 is formed from a positive type organic resist and is provided on the supporting body 51, a resist film 52 that is thin and of consistent thickness can be formed easily on the air bearing surface 103.

Figure 8:
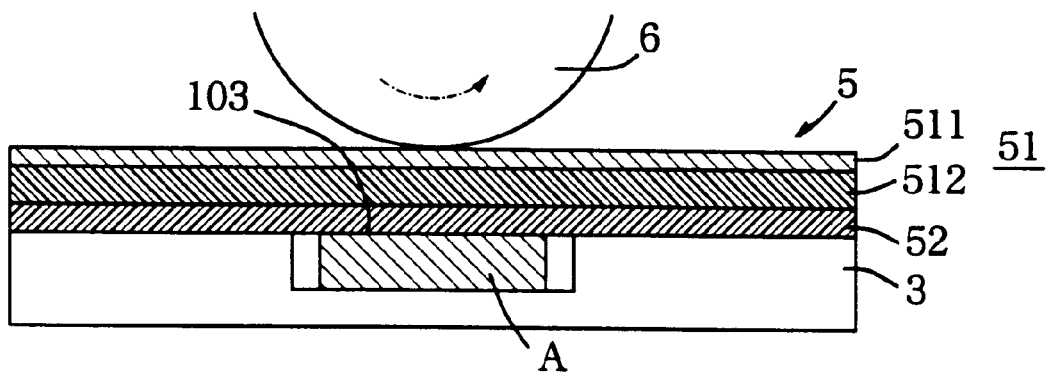
FIG. 8 illustrates a step included in another method for manufacturing a magnetic head according to the present invention.
Figure 9:
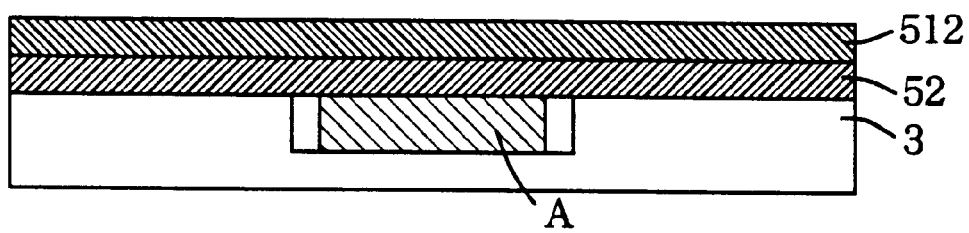
FIG. 9 illustrates a step that follows the step illustrated in FIG. 8.
Figure 10:
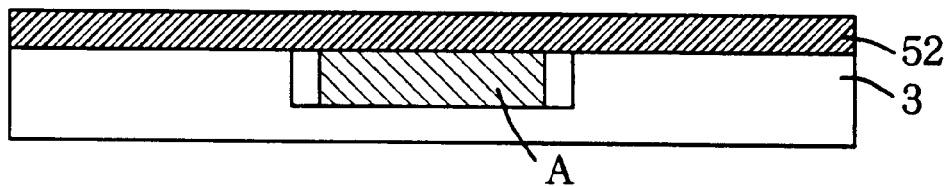
FIG. 10 illustrates a step that follows the step illustrated in FIG. 9.
Figure 11:
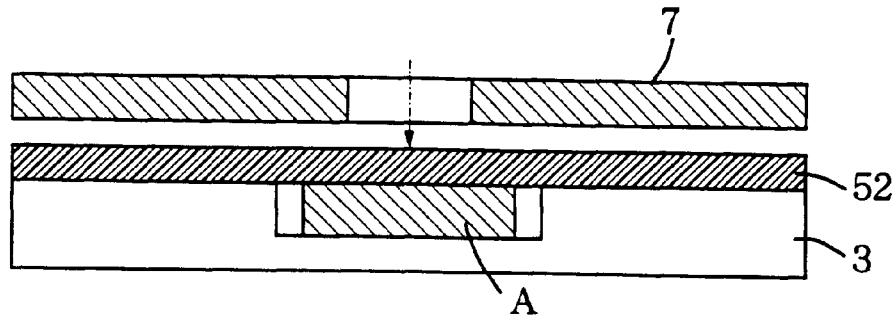
FIG. 11 illustrates a step that follows the step illustrated in FIG. 10.
Figure 12:
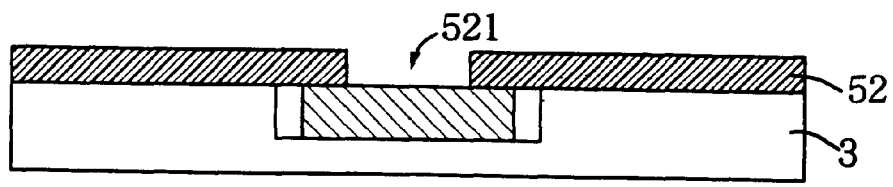
FIG. 12 illustrates a step that follows the step illustrated in FIG. 11.
Figure 13:
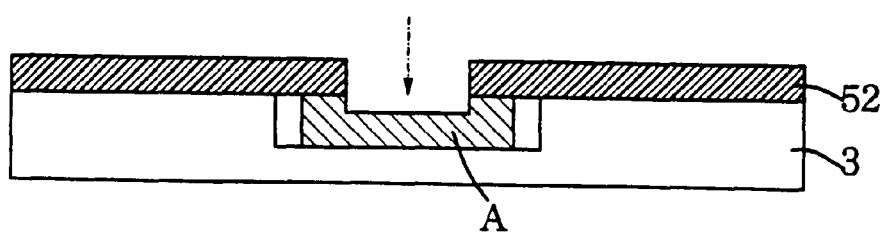
FIG. 13 illustrates a step that follows the step illustrated in FIG. 12.
Figure 14:
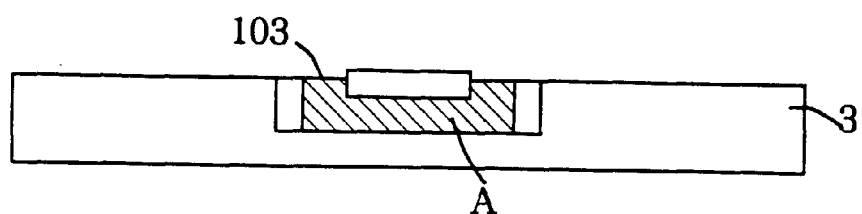
FIG. 14 illustrates a step that follows the step illustrated in FIG. 13.

FIGS. 8 to 14 are process drawings of another method for manufacturing a magnetic head according to the present invention. The transfer process is illustrated in FIGS. 8 to 10, the patterning process is illustrated in FIGS. 11 and 12 and the machining process is illustrated in FIGS. 13 and 14.

In FIG. 8, the supporting body 51 includes a support film 511 and a dry sheet resist film 512. The support film 511 is constituted of a flexible film such as polyethylene terephthalate. The dry sheet resist film 512 is constituted calf an organic resist and is formed on the support film 511. For the dry sheet resist film 512, either a negative type or positive type photo sensitive resist may be used. In this embodiment, a negative type photo sensitive resist, which can be etched with an alkaline developer, is used. Examples of such negative type photo sensitive resists include 4706 (manufactured by DuPont). The resist film 52 is constituted of a positive type resist and can be formed through the spin-coat method.

As shown in FIG. 8, during the transfer process, the resist film 52 is transferred on to the air bearing surface of the magnetic head A together with the supporting body 51. Next, as shown in FIG. 9, only the support film 511 is peeled off. Then, as shown in FIG. 10, the dry sheet resist film 512 is removed through a chemical process. The removal of the dry sheet resist film 512 is performed by directly etching with an alkaline developer without performing exposure. At this time, since the resist film 52 has not been exposed, it is not etched with the alkaline developer.

The supporting body 51 used in the manufacturing method includes the support film 511 and the dry sheet resist film 512. The dry sheet resist film 512 which is constituted of an organic resist is formed on the support film 511. In the transfer process, since the supporting body 51 is used and after the resist film 52 is transferred, the support film 511 is peeled off, the mechanical strength of the resist film 52 is fortified with the dry sheet resist film 512. Because of this, even when the resist film 52 is made very thin, separation and wrinkling of the resist film 52 are prevented when the support film 511 is peeled off. In addition, when the resist film 52 is constituted with a positive type resist, since the positive type resist film 52 will be relatively hard, its separation is prevented.

In the transfer process shown in FIGS. 8 to 10, since the dry sheet resist film 512 is removed through a chemical process, the dry sheet resist film 512 can be removed without any mechanical force being applied to the resist film 52. For instance, by using different materials, i.e., a positive type resist for the resist film 52 and a negative type resist for the dry sheet resist film 512, the dry sheet resist film 512 can be removed without subjecting the resist film 52 to any adverse chemical effect. Because of this, a thin and consistent resist film can easily be obtained.

In order to obtain the resist sheet 5 shown in FIG. 8, the supporting body 51 is applied on to a spin jig (not shown) and prebaking is performed at about 90° C. to 130° C. Next, after applying a barrier coat agent, a positive type organic resist 52 is spin-coated on to the dry sheet resist film 512 which in turn is on top of the support film 511. Through the prebaking process and the application of the barrier coat agent, a reaction between the positive type resist and the negative type resist is prevented. For the barrier coat agent, BC-5 (manufactured by Shigetsu Kagaku Co. Ltd.) may be used. The supporting body 51 also may be obtained by applying the support film 511 on to a spin jig and applying a negative type organic resist on to it through, for instance, the spin-coat method to form the dry sheet resist film 512.

Since the patterning process illustrated in FIGS. 11 and 12 and the machining process illustrated in FIGS. 13 and 14 are practically identical to those illustrated in FIGS. 4 to 7, their explanation is omitted here.

Figure 15:
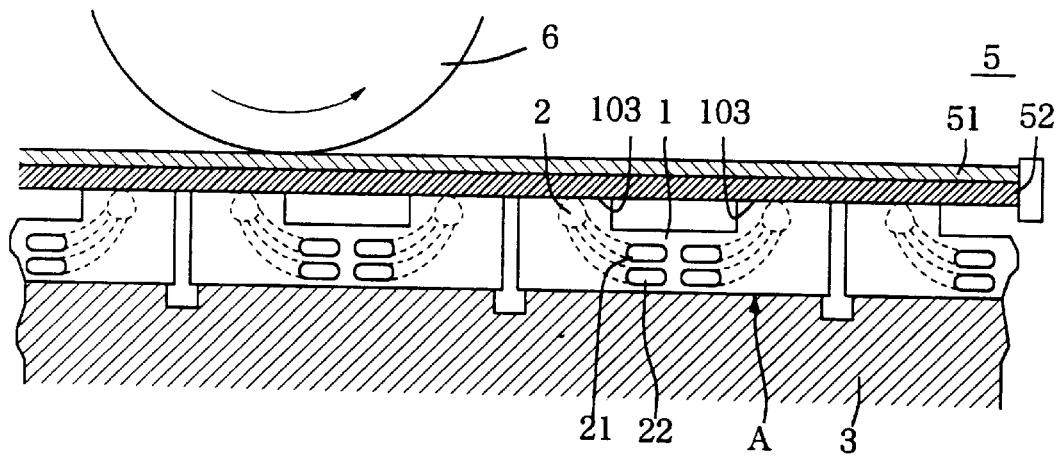
FIG. 15 illustrates the first step performed when the present invention is applied to production of a TPC type magnetic head.
Figure 16:
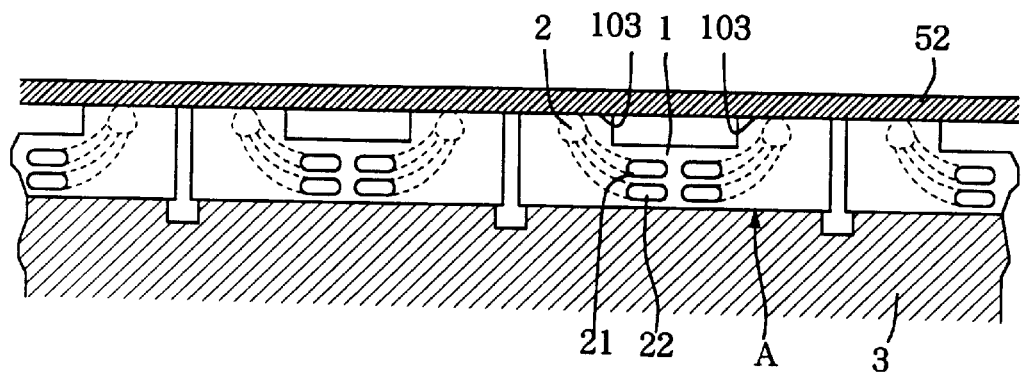
FIG. 16 illustrates a step that follows the step illustrated in FIG. 15.
Figure 17:
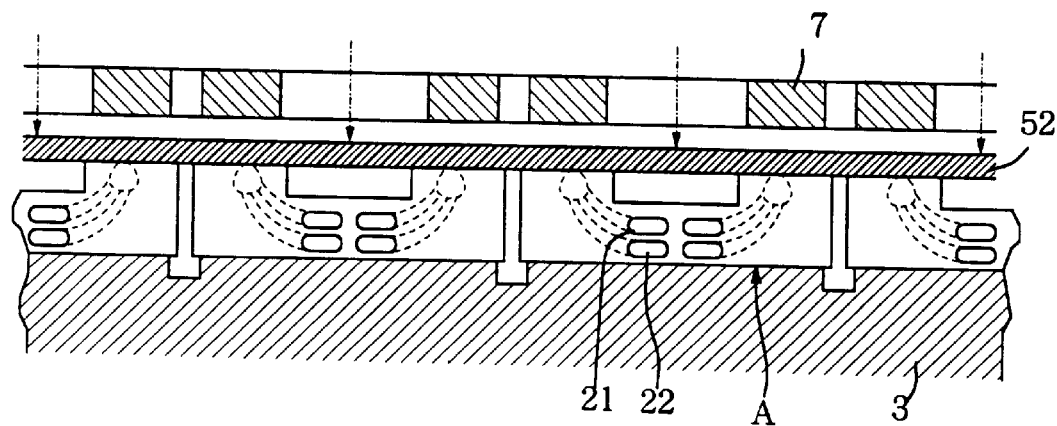
FIG. 17 illustrates a step that follows the step illustrated in FIG. 16.
Figure 18:
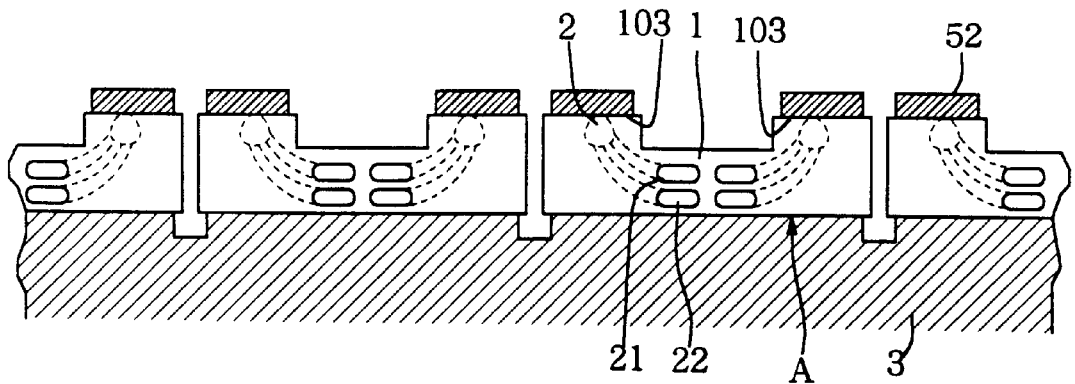
FIG. 18 illustrates a step that follows the step illustrated in FIG. 17.
Figure 19:
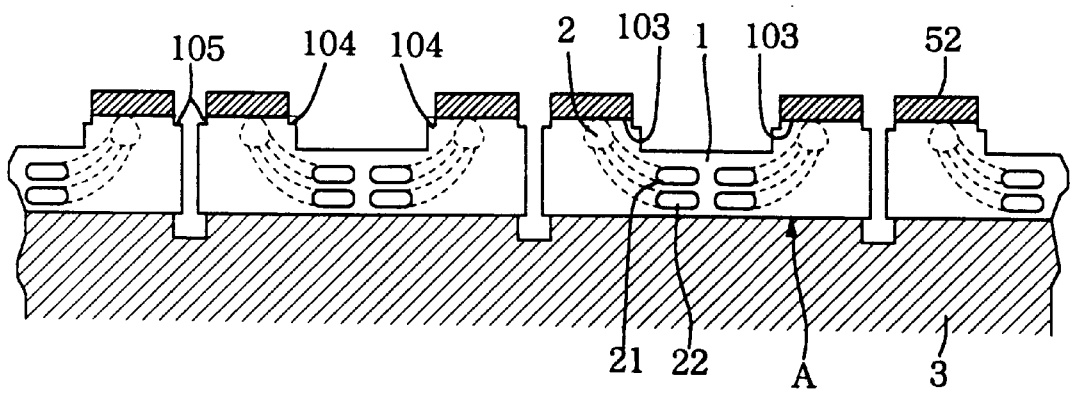
FIG. 19 illustrates a step that follows the step illustrated in FIG. 18.
Figure 20:
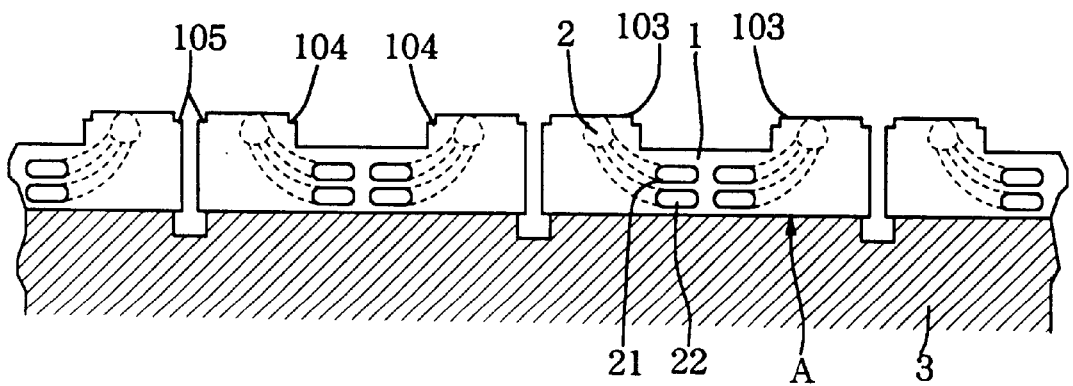
FIG. 20 illustrates a step that follows the step illustrated in FIG. 19.

Next, a specific example of the present invention applied to the TPC type magnetic head shown in FIG. 1 is explained in reference to FIGS. 15 to 20. FIGS. 15 and 16 illustrate the transfer process, FIGS. 17 and 18 illustrate the patterning process, and FIGS. 19 and 20 illustrate the machining process.

First, the transfer process is explained. As shown in FIG. 15, a magnetic head A is positioned on a jig 3. One surface of the magnetic head A is secured on the jig 3 by means such as bonding. In the magnetic head A, the air bearing surfaces 103 which emerge on the opposite side from the bonded surface, constitute polished surfaces with a high degree of flatness. The magnetic head A may be either cut and separated or may remain joined to the aggregate. The resist sheet 5 is overlaid in such a manner that the resist film 52 is placed on top of the air bearing surfaces 103 and thermo-compression bonding is performed by the hot roller 6. Then, as shown in FIG. 16, the supporting body 51 is peeled off from the resist film 52.

Next, the patterning process is explained. An exposure mask 7 is provided with the pattern required for machining and, as shown in FIG. 17, it is positioned over the resist film 52. The resist film 52 is exposed in this state. Specifically, the pattern of the exposure mask 7 is, for instance, a pattern which allows the portions that correspond to the pole portions P1 and P2 (see FIG. 1) to be shielded from exposure and the portions that correspond to the first step portions 104 and the second step portions 105 (see FIG. 1) to be exposed.

Now, when the exposed area is etched with an alkaline developer, the resist film 52 remains only in the areas enclosed by the first step portions 104 and the second step portions 105 of the TPC type slider 1, as shown in FIG. 18. Thus, the resist film 52 is patterned to become the pattern required for machining of the first step portions and the second step portions 105 of the TPC type slider 1.

Finally, the machining process is explained. As shown in FIG. 19, machining is performed on the air bearing surfaces 103 of the slider 1 via the gaps in the resist film 52 which are formed in the patterning process. In the machining process, the first step portions 104 and the second step portions 105 are formed to a required depth through fine machining means such as, for instance, ion milling. Then, as shown in FIG. 20, the resist film 52 is removed. The removal of the resist film 52 may be performed either through chemical etching or physical etching. While not shown in the figures, the manufacturing method illustrated in FIGS. 8 to 14 may also be applied to this process.

Figure 21:
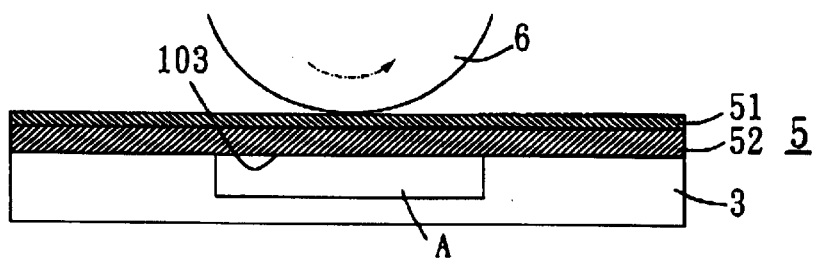
FIGS. 21 and 22 illustrate a transfer process of another example of a method of manufacturing a magnetic head according to the present invention.
Figure 22:
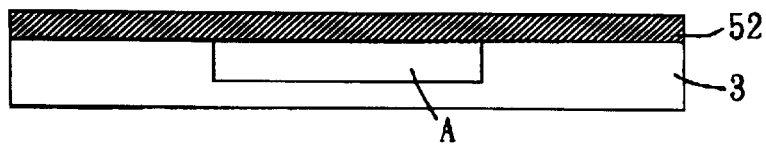
Figure 23:
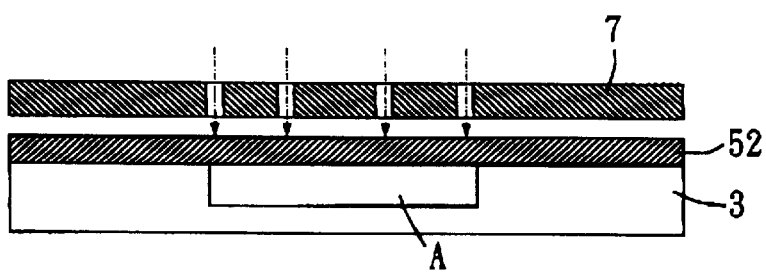
FIGS. 23 and 24 illustrate a patterning process of the other example of the method of manufacturing the magnetic head.
Figure 24:
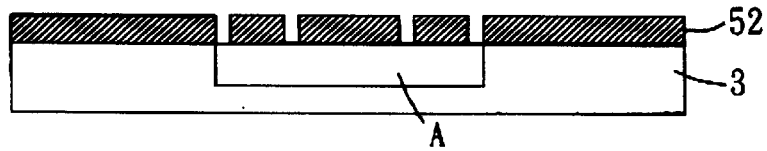
Figure 25:
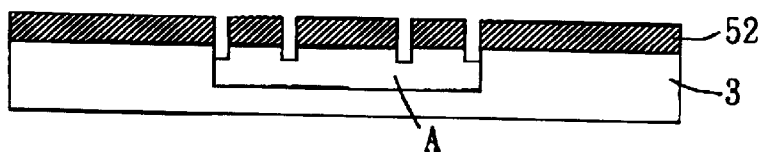
FIGS. 25 and 26 illustrates a first machining process of the other example of the method of manufacturing the magnetic head.
Figure 26:
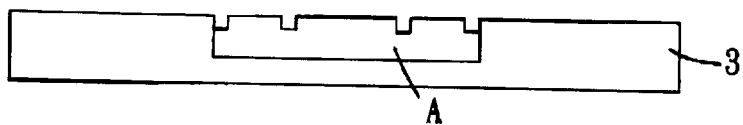
Figure 27:
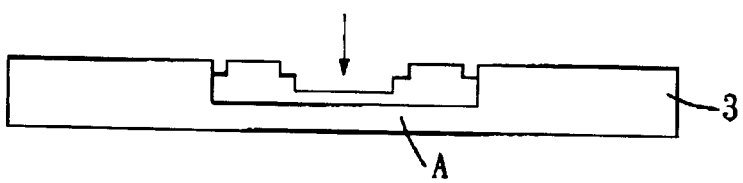
FIG. 27 illustrates a second machining process of the other example of the method of manufacturing the magnetic head.

FIGS. 21 to 27 are process drawings that show another example of the method for manufacturing a magnetic head according to the present invention. The method for manufacturing a magnetic head according to the present invention includes a transfer process, a pattering process and a first and second machining process. The transfer process is illustrated in FIGS. 21 and 22, the patterning process is illustrated in FIGS. 23 and 24, the fist machining process is illustrated in FIGS. 25 and 26 and the second machining process is shown in FIGS. 27.

In the transfer process, a magnetic head A is arranged on a jig 3 with one of its surfaces secured to the jig 3 by means such as bonding. A resist sheet 5, which is provided with an organic resist film 52 on a supporting body 51, is placed on top of the surface 103. Then the resist film 52 is transferred on to the air bearing surface 103. The transfer can be achieved through thermo-compression bonding using a hot roller 6 (see FIG. 21). Next, as shown in FIG. 22, the supporting body 51 is removed. The resist film 52 is not removed and remains on the magnetic head A and on the jig 3. Unlike the spin-coat method, this process eliminates the necessity of providing an inclination at the end of the surface 103. Because of this, a consistent resist film 52 can be formed on the surface 103 regardless of the contour of the surface 103. Furthermore, with the consistent film thickness of the resist film 52 formed on the resist sheet 5, a consistent film thickness required for fine machining is achieved.

The supporting body 51 is a flexible film, constituted by polyethylene terephthalate or the like. Generally, a photo sensitive resist is used for the resist film 52. The photo sensitive resist may be either the negative or the positive type. In the embodiment, a positive type photo sensitive resist is used. Positive type photo sensitive resists include, for instance, PFR 3004 (manufactured by Nippon Gosei Gommu Co. Ltd.). The resist film 52 may be formed through, for instance, the spin-coat method. The film thickness of the resist film 52 is set at a consistent thickness required for machining the surface 103.

In the patterning process, which follows the transfer process, the resist film 52 is partially removed to achieve the pattern required for machining. To be more specific, as shown in FIG. 23, an exposure mask 7 is positioned on the resist film 52 to expose the resist film 52.

In the first machining process, machining such as ion milling is performed on the surface 103 via the gaps in the resist film 52 which remains after the patterning process, as shown in FIG. 25. Then, as shown in FIG. 26, the remaining resist film 52 is removed.

Then, in the second machining process, shown in FIG. 27, machining such as ion milling is performed on the surface 103 so as to form two final air bearing surfaces with each having at least one indented portion.

Through the patterning process and the machining process described above, it becomes possible to form the resist film 52 with a consistent film thickness provided with the pattern required for fine machining on the surface 103 and thus it becomes possible to perform fine machining on the surface 103. This makes it possible to form a consistent film 52 on the surface 103 regardless of the contour of the surface 103, and to perform fine machining on the surface 103.

The resist sheet 5, shown in FIG. 21, is obtained by applying a flexible film such as polyethylene terephthalate or the like, which constitutes the supporting body 51, on to a spin jig (not shown) and spin-coating a positive type organic resist on to it. When using PFR3004 (manufactured by Nippon Gosei Gommu Co. Ltd.) for the positive type resist, by spin-coating the organic resist at a viscosity of 160 cp at a rotation rate of 3000 rpm, a resist film 52 with a film thickness of 4.5 $\mu$m is obtained. The film thickness can easily be changed by adjusting the viscosity and the rotation rate. Since the spin jig has a high degree of flatness and the thickness of the supporting body is consistent, the film thickness of the spin-coated resist is also consistent. Other methods that can be employed for forming the resist film 52 include the dip method, the roll coat method and the spray coat method.

As described above, when the supporting body 51 is constituted of a flexible film such as polyethylene terephthalate, and the resist film 52 is formed from a positive type organic resist and is provided on the supporting body 51, a resist film 52 that is thin and of consistent thickness can be formed easily on the surface 103.

While specific examples of manufacturing a TPC type slider have been explained in reference to the drawings so far, the present invention can be widely applied when it is necessary to perform fine machining on the air bearing surface 103. For instance, the present invention may be employed when setting the width of the pole portions in the direction of the tracks with a high degree of precision, and when performing machining to form indented portions of minute depth at or near the pole portions to improve the electromagnetic conversion characteristics.

While the invention has been particularly shown and described with reference to preferred embodiments thereof, it will be understood by those skilled in the art that various changes in form and detail may be made therein without departing from the spirit, scope and teaching of the invention.

What is claimed is:

1. A method for forming at least one intended portion on a surface of a magnetic head, comprising the steps of:

forming an initial air bearing surface on a magnetic head;

overlaying a resist sheet which is provided with an organic resist film on a supporting body on said initial air bearing surface;

transferring said organic resist film onto said initial air bearing surface and removing said supporting body from said organic resist film;

through a patterning process partially removing said organic resist film to achieve a pattern including gaps in said organic resist film; and performing a machining operation on said initial air bearing surface so as to form said at least one indented portion via said gaps in said organic resist film and then removing said resist film, wherein the transferring step is performed through thermo-compression bonding using a hot roller, and wherein a depth of the at least one indented portion of the air bearing surface is $\leq 1$ μm.

2. A method for forming according to claim 1, wherein:

said organic resist film comprises a positive type resist.

3. A method for forming according to claim 1, wherein:

said organic resist film of said resist sheet is formed through spin coating.

4. A method for forming according to claim 1, wherein:

said supporting body includes a support film and a dry sheet resist film including an organic resist and formed on said support film; and after said organic resist film is transferred on to said air bearing surface, said support film is peeled off and then said dry sheet resist film is removed through a chemical process.

5. A method for forming according to claim 4, wherein:

said dry sheet resist film comprises a negative type resist; and said organic resist film comprises a positive type film.

6. A method for forming according to claim 4, wherein:

said dry sheet resist film and said organic resist film are formed through spin-coating.

7. A method for forming at least one indented portion on a surface of a magnetic head, comprising the steps of:

overlaying a resist sheet which is provided with an organic resist film on a supporting body on a surface of a magnetic head;

transferring said first organic resist film onto said surface of said magnetic head by removing said supporting body from said first organic resist film;

through a patterning process partially removing said organic resist film to achieve a pattern including gaps in said organic resist film;

performing a machining operation on said surface of said magnetic head so as to form an initial air bearing surface having at least one indented portion via said gaps in said organic resist film and then removing said resist film; and performing a machining operation on said initial air bearing surface so as to form two final air bearing surfaces each having at least one indented portion, wherein the transferring step is performed through thermo-compression bonding using a hot roller, and wherein a depth of the at least one indented portion of the air bearing surface is $\leq 1$ μm.

8. A method for forming according to claim 7, wherein:

said organic resist film comprises a positive type resist.

9. A method for forming according to claim 7, wherein:

said organic resist film of said resist sheet is formed through spin coating.

10. A method for forming according to claim 7, wherein:

said supporting body includes a support film and a dry sheet resist film comprising an organic resist and formed on said support film; and after said organic resist film is transferred on to said air bearing surface, said support film is peeled off and then said dry sheet is removed through a chemical process.

11. A method for forming according to claim 10, wherein:

said dry sheet resist film comprises a negative type resist; and said organic resist film comprises a positive type film.

12. A method for forming according to claim 10, wherein:

said dry sheet resist film and said organic resist film are formed through spin-coating.

* * * * *